Feb. 9, 1943.      C. E. SANBORN      2,310,654
FISHING REEL
Filed July 13, 1940      2 Sheets-Sheet 1
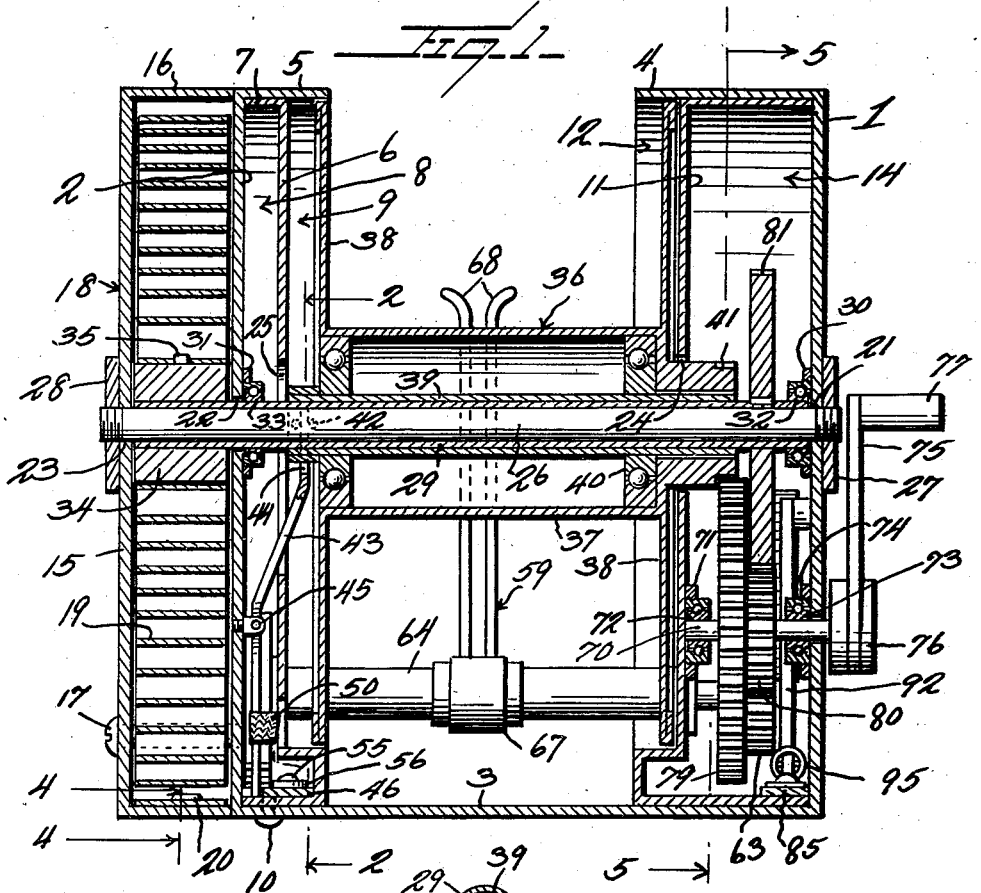
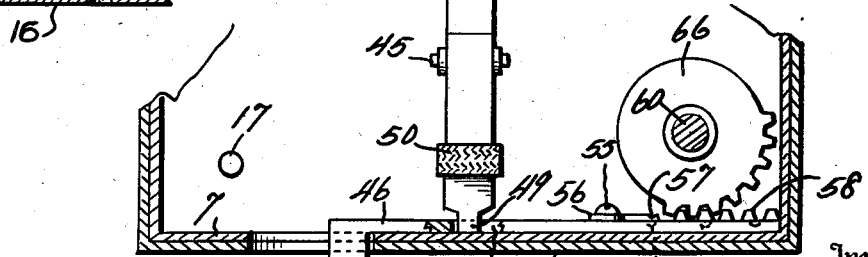
Inventor
C. E. Sanborn
By Watson E. Coleman
Attorney

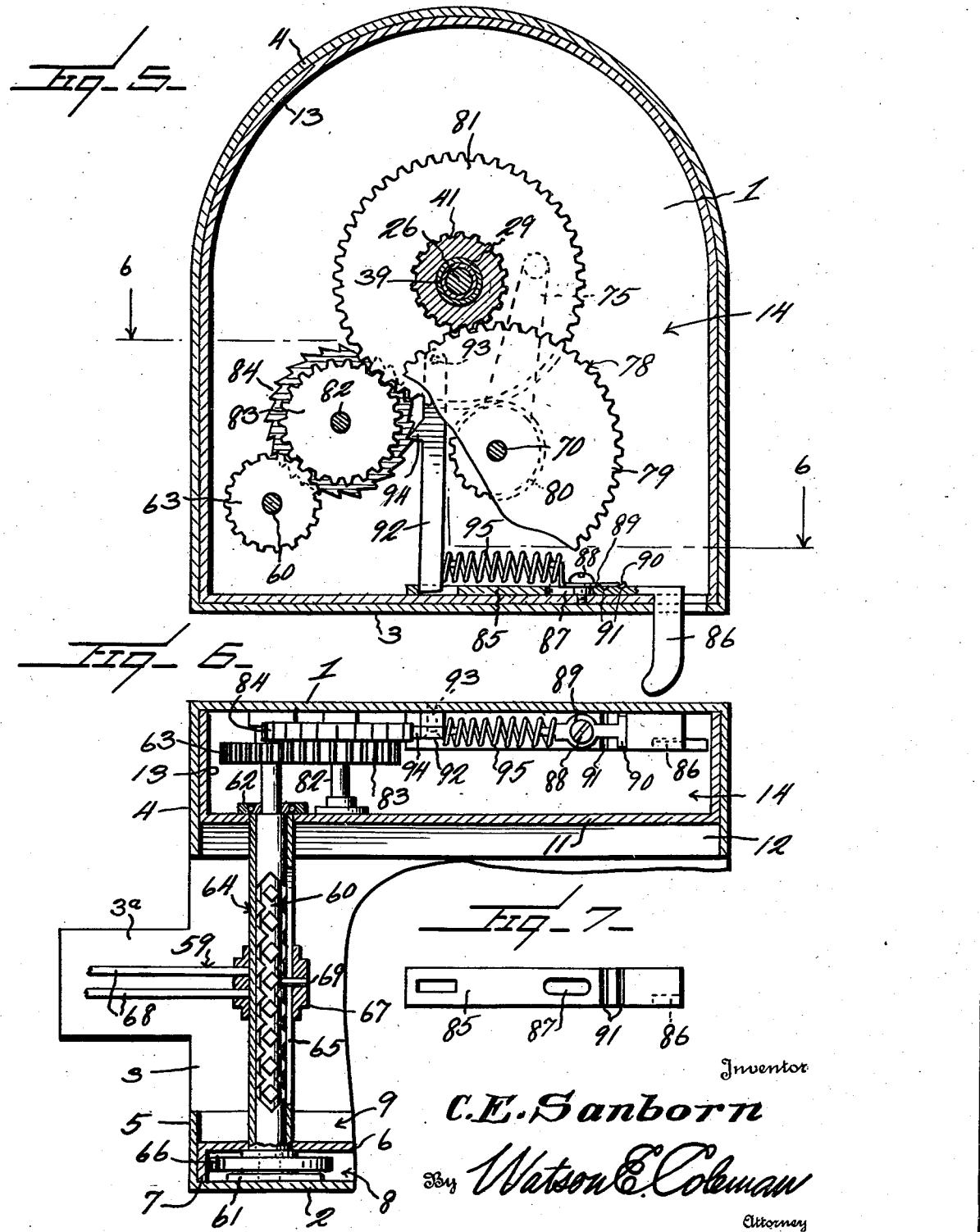

Patented Feb. 9, 1943

2,310,654

UNITED STATES PATENT OFFICE 2,310,654

FISHING REEL

Charles E. Sanborn, Stillwater, Okla.

Application July 13, 1940, Serial No. 345,409

9 Claims. (Cl. 242—84.3)

This invention relates generally to fishing tackle or gear and pertains particularly to improvements in fishing reels.

The present invention has for its primary object to provide an improved fishing reel which is so designed that it may be used for fly casting, bait or plug casting or for any other type of fishing desired, and which is designed for automatic re-winding action independently of or in association with a hand crank control.

Another object of the invention is to provide an improved fishing reel wherein a novel construction is employed to provide for a free running spool, such free running action of the spool being accomplished by the shifting of the spool in the reel frame toward or away from controlling gears by means of which its manual or spring propelled rotation is effected.

Still another object of the invention is to provide an improved fishing reel having a novel level winder associated therewith which is adapted to be swung into and out of operation with respect to the fishing line, by the manipulation of a conveniently arranged finger trigger.

A still further object is to provide a fishing reel having a spool which is shiftable axially of the reel structure to move it into and out of free running position, by a novel finger trigger control mechanism.

Still another object is to provide a novel braking means for the reel spool which is also under the control of the finger actuated trigger by which the movement of the spool into and out of free running position is effected.

Other objects and advantages of the invention will become apparent as the description of the same proceeds and the invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a sectional view taken vertically on the longitudinal center of the reel structure looking forwardly from the fisherman's position behind the reel.

Fig. 2 is a sectional view taken substantially on the line 2—2 of Fig. 1.

Fig. 3 is a view in plan of the tail trigger slide.

Fig. 4 is a sectional view on the line 4—4 of Fig. 1.

Fig. 5 is a sectional view substantially upon the line 5—5 of Fig. 1.

Fig. 6 is a sectional view substantially on the line 6—6 of Fig. 5.

Fig. 7 is a plan view of the head trigger slide.

Referring now more particularly to the drawings, the numerals 1 and 2 designate respectively the head and tail plates of the reel structure, which plates are joined together by the base plate 3, which is provided at its forward and rear edges with extension tongues 3ª, one only of which is shown, Fig. 6, which facilitate the attachment of the reel to the reel seat of a fishing rod, these extensions or tongues 3ª being engaged one beneath the usual fixed ring or collar of the fishing rod while the other is engaged by the slip ring with which the rod is equipped.

The head and tail plates are defined along their front and rear edges and along the arcuate top edges thereof by the inwardly extending flanges 4 and 5, respectively, which constitute peripheral walls.

Within the area defined by the wall 5 of the tail plate is disposed an inner tail plate 6 which is set inwardly from the free edge of the wall 5 and which has an outlining flange 7 which along its outer surface engages the inner face of the flange 5 and the top of the bottom wall 3 and abuts the inner side of the tail plate 2, as shown in Fig. 1, and thereby providing the tail chamber 8. The inner tail plate 6 is set inwardly from the edge of the wall flange 5, forming a recess 9 which opens toward the head plate about to be described. The inner and outer tail plates are secured together by suitable screws which pass through the bottom wall 3 and the flange 7 resting thereon, such screws being indicated at 10.

In spaced relation with the head plate 1 is an inner head plate 11 which is set inwardly of the free edge of the peripheral wall flange 4 forming the recess 12 and which has an outlining flange 13 which bears throughout its extent against the inner side of the wall flange 4 and against the top surface of the bottom 3, the inner edge of this flange 13 abutting the inner side of the plate 1, thus maintaining the plates 1 and 11 in a desired spaced relation and providing a head chamber or gear box 14.

In spaced relation with the outer side of the tail plate 2 is located a wall plate 15 which is of the same form in outline as the plate 2 and which is maintained in spaced relation with the latter by the integral inwardly extending flange 16, by suitable holding screws 17, thus forming at the tail side of the reel structure, a housing or casing 18 for a coiled leaf spring 19. One end of this spring is secured at the bottom of the reel structure or at the bottom of the housing 18 by a suitable hook or securing element 20 while the other end of the spring which is at the center thereof, is secured in the manner hereinafter described.

The head plate 1 is provided at its center with a shaft opening 21 and the tail plate 2 is provided with a similar shaft opening 22. At the center of the spring housing wall plate 15 is a shaft opening 23. These shaft openings are all coaxial and are coaxial with larger openings 24 and 25 formed through the inner head and tail plates 11 and 6, respectively.

Extending through the shaft openings of the several plates is a solid shaft 26. At its head end, this shaft has threaded thereon the nut 27 which bears against the head plate while at its tail end it has threaded thereon the nut 28 which bears against the tail plate.

Encasing the major portion of the shaft 26 is an inner tubular rotary shaft 29 which passes through the shaft openings of the plates 2, 6 and 11, but terminates adjacent the inner faces of the plates 1 and 15. Secured to the inner faces of the head and tail plates 1 and 2 are the nuts 30 and 31, respectively, which are concentric with the adjacent shaft openings and within these nuts are disposed ball bearing units 32 and 33, respectively, each of which comprises the usual inner and outer ring members, not specifically designated, the outer members being threaded into the nuts encircling them, thus leaving the inner members free to rotate and the rotary tubular shaft 29 extends through these freely rotating inner members of the bearings and is supported thereby.

The tubular shaft 29 extends through the spring housing 18 and carries within the housing, the hub 34 around which the spring is coiled and to which the inner end of the spring is attached, as indicated at 35. Thus when the tubular shaft 29 is rotated in one direction, the spring will be wound up and the spring will react under appropriate circumstances to reversely rotate the shaft.

The numeral 36 generally designates the line carrying spool of the reel structure, which spool includes the cylinder 37 and the end flanges 38. The length of the spool is such that the flanges will be at all times within the recesses 9 and 12, but will be shifted in the use of the reel to the inner and outer sides of the recesses as will hereinafter become clear.

Extending axially through the cylinder 37 of the spool is the tubular shaft 39 which forms a sleeve about the inner tubular shaft or spring shaft 29. Secured within the ends of the spool cylinder are bearing units 40, each of which comprises the usual inner and outer units, not specifically designated, and the outer units of these bearings are secured to the cylinder 37 while the inner units are secured to the spool shaft 39. Thus it will be seen that the spool will rotate freely on the bearing units 44 about the tubular shaft with which the inner members of the bearing units are connected.

Upon the head end of the spool there is formed and integrally connected with the spool, the gear hub 41 which extends through the shaft opening 24 of the inner head plate, into the gear box 14. The spool shaft 39 extends through and to the end of the hub 41.

At the tail end of the spool shaft 39 there are formed the oppositely arranged outwardly extending pairs of ears 42. Within the chamber 8 there is disposed the vertical shift lever 43 which at its upper end is provided with a fork 44 which receives the adjacent end of the shaft 39 and has its two ends each engaged between the pair of ears 42. This shift lever is angled, as shown, and is connected by a suitable hinge joint or connection 45 with the inner face of the tail plate 2 to oscillate on a horizontal axis. The upper end of the lever 43 extends through the central opening of the inner tail plate 6 in order to reach the end of the shaft 39 while the lower end of the lever is disposed in close proximity to the bottom part of the flange 7 of the inner tail plate.

Disposed within the bottom part of the chamber 8 which houses the shift lever 43 and resting upon the bottom part of the flange 7 which forms a floor for the tail chamber, is the elongated shift slide 46. This slide is of a width substantially equaling the inside width of the chamber and is adapted to move forwardly and rearwardly of the reel or, in other words, transversely to the axis of rotation of the spool. At its rear end, the slide 46 is provided with a downturned trigger finger 47 which extends through a suitable slot in the bottom plate 3 and the bottom part of the flange 7, making it accessible to the trigger finger of the fisherman while holding in his hand the fishing rod upon which the reel is mounted.

The slide 46 is provided with a longitudinally extending slot 48 which is formed to have the three parallel communicating offset portions 48ª, 48ᵇ and 48ᶜ. The portion 48ᵇ which is in between the other two portions is substantially upon the longitudinal center of the slide. This slot 48 constitutes a control slot or a control coupling means between the slide and the lower end of the shift lever 43, the lower end of this lever being provided with the terminal finger 49 which is permanently engaged in the slot.

The lower end portion of the lever 43 carries a friction element 50 which, when the lever has its lower end shifted toward the adjacent spool flange, engages such flange to control the turning of the spool. This action is accomplished when the slide 46 is moved so as to bring the end 48ᶜ of the slot into position to have the finger engaged therein.

Forwardly of the slot 48, the slide has a second guide slot formed longitudinally thereof and indicated at 51. In the top surface of the slide are formed the transverse notches 52, 53 and 54, which intersect the guide slot 51. A set screw 55 extends through the guide slot 51 and engages the bottom plate 3, and this screw secures in place upon the top of the slide a spring clip 56 which carries the resilient fingers 57 which extend transversely of the slide upon the top thereof and are adapted for selective engagement in the notches 52, 53 and 54. These several notches cooperate with the fingers of the spring clip to hold the slide with the finger of the shift lever 43 in different portions of the shift lever control slot 48 in accordance with the desires of the user of the reel.

Integral with the forward end of the slide is a toothed rack 58, the purpose of which is about to be described.

At the front side of the reel structure there is disposed a level winder unit indicated generally by the numeral 59. This unit includes a double thread worm shaft 60, which extends transversely of the space between the inner head and tail plates and into the chambers 8 and 14. In the chamber 8, a bearing unit 61 is secured to the wall 2 in which the tail end of the shaft 60 is rotatably mounted while upon the inner side of the inner head plate 11 is a similar bearing unit 62 through which the head end of the worm shaft passes, such head end of this shaft supporting a gear 63 within the gear box or head chamber. Enclosing the double threaded shaft 60 is the tubular shaft housing 64 which is provided with a longitudinal slot 65, and this shaft housing is supported in suitable bearing openings in the adjacent plates 6 and 11 and is held against lengthwise movement by contact at its ends with the opposing faces of the bearings 61 and 62.

Within the chamber 8, the tubular housing 64 carries a gear segment 66 which is in mesh with the toothed rack 58.

Slidably supported upon the tubular housing 64 is a carriage 67 for the level winder guides 68 which are attached to the carriage. This carriage is in the form of a sleeve which encircles the housing 64 and carries a cam finger 69 which extends through the slot 65 of the housing and engages in the grooves of the double threaded shaft whereby upon rotation of the shaft, the carriage will be given reciprocal movement from one side of the reel to the other.

When the shift slide 46 is shifted forwardly so that the finger 49 is in the rear end portion 48ª of the slot 48, the spool 36 will be in winding position and the line guide fingers 68 will be raised, but when the slide 46 is shifted rearwardly so that the finger 49 is in the central part of the guide slot 48, the spool will be shifted to free reeling position, as will be hereinafter more specifically described, and the line guides will be lowered. When the slide is moved all the way to the rear where the fingers 57 will be engaged in the notch 56, the finger 49 will be in the forward end portion 48ᶜ of a guide slot 48, and the brake friction member 50 will contact the flange of the spool to hold the same from rotating or to check its rotation.

Extending transversely through the lower part of the head chamber or gear box 14 is a crank shaft 70, one end of which extends through the head plate 1. Secured against the inner side of the inner head plate 11, by means of a nut 71, is a bearing unit 72 in which is supported the inner end of the crank shaft 70. A similar bearing unit 73 is supported upon the inner side of the head plate 1 by the nut 74, through the center of which latter unit the shaft passes the outside of the gear box. Upon the outer side of the gear box, the shaft has attached thereto a crank arm 75 which is secured by the inner and outer lock nuts 76, which are threaded on the crank shaft and the crank arm carries the usual handle 77 by which its turning is effected.

Within the gear box, the crank shaft supports and has secured thereto the double gear 78 which is made up of a gear of large diameter 79 and a gear of small diameter 80. The gear of large diameter 79 meshes with the spool gear 41 when the latter is shifted toward the head of the reel structure by the proper manipulation of the shift slide 46. The small diameter gear 80 meshes with a gear 81 which is keyed to the spring winding shaft 29.

Supported within the gear box, transversely thereof, is a ratchet gear shaft 82 and upon this shaft is mounted the ratchet gear 83 together with a ratchet wheel 84 which is joined to the gear 83.

The gear 83 is in mesh with and operatively couples together the spring gear 81 and the gear 63 which is connected with the level winder shaft 60.

Slidably supported upon the bottom portion of the flange 13 of the inner head plate 11, and within the gear box 14, is a head trigger slide 85. This slide is provided at one end with the downturned finger 86 which extends through a slot in the plate 3 and in the adjoining portion of the flange 13, the finger being located at the rear side of the reel structure so that it may be manipulated by a finger of the hand holding the rod on which the reel is mounted, in a similar manner to the finger 47. Naturally, these fingers 47 and 86 will be upon opposite sides of the rod but they may be readily engaged and actuated by the finger of the hand holding the rod.

The slide plate 85 is provided with a longitudinal slot 87 through which extends the set screw 88 which engages in the underlying flange 13. This set screw secures in position on top of the slide plate 85 the spring clip 89 having the resilient arms 90 which are adapted for selective engagement in the notches 91 which are formed in the surface of the slide plate across the slot 87.

At its forward end, the slide plate has loose connection with the lower end of a ratchet pawl 92, which pawl is suspended from a transverse pin 93 for oscillation on an axis paralleling the crank shaft 70. This pawl is provided with the tooth 94 which engages or is engaged by the teeth of the ratchet gear 84.

The spring clip has engaged therewith one end of a compression spring 95, the other end of which spring engages the pawl 92 and normally urges the same toward the ratchet gear.

In the operation of the reel, the crank 75 is turned in a clockwise direction for the purpose of winding in or reeling in a line upon the spool 36. When this method of taking in the fishing line is employed, the pawl 92 must be disengaged from the ratchet wheel by pulling the head trigger finger 86 rearwardly. This permits the necessary rotation to be transmitted through the gear 83 to the gear 63 for the rotation of the shaft 60 and the operation of the level winder. If the spring has previously been placed under tension, it may be employed to wind in the fishing line without actuating the crank handle, merely by disengaging the pawl 94 from the ratchet wheel. This permits the gears to rotate freely in the winding direction under the urge of the spring. If the load upon the line is greater than the spring can take care of, then it will be readily seen that assistance may be given the spring by turning the crank clockwise in the manner first stated. When the spring is to be placed under tension, this may be accomplished by turning the crank 75 counterclockwise. First, however, the tail trigger finger must be shifted, if it is not already in the free spooling position, so that the lever 43 will be rocked at its lower end toward the spool. This will place the finger 49 in the central portion 48ᵇ of the slot 48 and will disengage the gear 41 from the gear 79. The crank may then be freely turned in a counterclockwise direction so as to effect the winding up of the spring and the ratchet pawl will ride over the ratchet teeth and will function, when the winding is stopped, to engage the ratchet teeth and hold the spring against unwinding.

For permitting the free stripping of the line from the spool or for casting, the spool will be shifted to the same neutral position specified above for permitting the winding up of the spring. When the slide plate 46 is shifted as stated, to move the spool to free wheeling position, the gear segment 66 will be turned so as to oscillate the sleeve 64 and this will throw the guide fingers 68 of the level winder forwardly and downwardly. Thus the line may be freely cast without being checked in any way by the guides.

If the line is being drawn out by a fish, the teeth of the ratchet wheel will over-run the pawl 94 and the gears will be turned in a direction which will wind the spring, and this will have a restraining action upon the fish. However, the spool may be set for free turning or rotation when the line is being drawn off as, in bait fishing, when a fish has taken the hook and before the hook is set in the fish's mouth or as in fly or bait casting, and the unreeling of the line may be checked or stopped as desired by pulling the tail trigger 41 so as to shift the finger 49 toward the portion 48c of the slot 48. By the application of regulated pressure, the brake element 50 will be applied lightly or intensely, as desired, against the flange of the wheel. By this means the running off of the line may be gradually retarded or entirely stopped, as may be desired. The brake may also be set for preventing the line from unwinding when the spool is being carried in the free spooling position by shifting the slide plate 46 into a position where the finger 49 will be engaged in the straight portion 48c of the slot 48. However, when playing a fish after it is hooked, the reel should be engaged with the gear mechanism so that the line can be drawn off and retrieved by the automatic unit or retrieved by the combined operation of the hand crank and the spring, or in the event that the automatic unit has been removed, as may be done in the manner hereinafter described, the retrieving of the line may be accomplished by hand crank action alone.

It will be readily apparent from an examination of Fig. 1 of the drawings that the automatic re-winding means may be readily removed so that the reel may be operated entirely by hand. This removal of the automatic re-winding means is accomplished by taking off the nut 28 and removing the securing screws 17 which secure the casing 18 to the tail end of the reel or to the tail plate 2. In converting the reel in this manner after the spring and spring casing have been removed, the shafts 26 and 29 will be taken out and replaced by shorter corresponding shafts which terminate respectively upon the tail and head sides of the tail plate 2. From this, it will be readily apparent that two distinct reel structures are combined in the one reel disclosed, one structure giving both automatic and hand rewinding control and the other a hand control alone. In both types, the free turning of the line spool may take place as desired, by the fisherman.

Another unique feature of the present reel structure is the provision of ball bearings for supporting the rotating parts which permits of the elimination from the reel structure of the cross bars which are commonly employed in reels to connect the head and tail plates and which extend in parallel relation with the supporting shaft for the spool. Thus the frame for the reel is entirely free of obstructing members over the spool which are particularly bothersome when it becomes necessary to straighten out or unravel a back-lash.

What is claimed is:

1. A fishing reel, comprising a frame, a line spool supported in the frame for rotation and for limited axial movement, a crank supported by the frame, a gear coupling between the crank and the spool for effecting the rotation of the latter by the crank, a level winder carried by the frame and including a pair of guide fingers, an operative connection between the level winder and said gear means for effecting the movement of the guide fingers axially of the spool, means supporting said fingers for oscillation transversely of the axis of the spool to facilitate movement of the fingers into and out of line guiding position and means for effecting the axial shifting of the spool to disconnect the same from said gear means and the simultaneous rocking movement of the level winder fingers out of line guiding position.

2. A fishing reel, comprising a frame, a line spool supported within the frame for rotation and for axial movement, a gear train supported by the frame and operatively coupled with said spool, means carried by the frame for actuating the gear train to effect the rotation of the spool, a level winder unit carried by the frame and including a pair of spaced guide fingers, means operatively coupling said guide fingers with the gear train for effecting movement of the fingers axially of the spool, means supporting the fingers for oscillation transversely of the axis of the spool to facilitate movement of the fingers into and out of line guiding position, a lever pivotally supporting upon the frame and connected at one end with said spool, and means supported on the frame for shifting movement and having operative connection with said lever at its other end and with said level winder fingers, to effect the simultaneous axial shifting of the spool and the oscillation of said fingers into and out of line guiding position.

3. A fishing reel, comprising a frame, a line spool supported by the frame for rotation, means carried by the frame and operatively coupled with the spool for effecting the turning of the spool, a level winder unit disposed at one side of the spool and including a pair of spaced line guiding fingers, said level winder unit also including a double spiral shaft and means coupling spirals of the shaft with the fingers for effecting movement of the fingers lengthwise of the shaft upon rotation of the latter, means operatively coupling said shaft with said spool turning means, a longitudinally slotted sleeve enclosing said spiral shaft and turnable thereon and having said coupling means extending through the slot thereof for engagement with the shaft, means supporting said fingers on the sleeve for oscillation in a path transverse to the spool and coaxially with the shaft, a reciprocable finger carried by the frame for front and rear movement, and a rack and gear segment operatively coupling said reciprocable finger with said sleeve to facilitate oscillation of the sleeve and oscillation of the fingers transversely of the spool.

4. A fishing reel, comprising a frame having a head body provided with a chamber and a tail body in spaced relation with the head body, a shaft extending between said bodies, a line spool supported on the shaft for rotation and axial movement, a gear forming a hub-like extension upon an end of the spool and projecting into said chamber, a gear train within said chamber having one of the gears thereof disposed for operative engagement with said hub gear, a power applying means operatively coupled with said gear train for imparting rotational movement therethrough to the spool, a level winding unit disposed upon one side of the spool and including a longitudinally slotted axially turnable sleeve and a threaded shaft rotatably supported within the sleeve, said unit also including a collar encircling the sleeve, a finger carried by the collar and extending through the slot of the sleeve and engaging the thread of the shaft, and a pair of line guiding fingers carried by the collar, a gear connection between said threaded shaft and said gear train, and a finger actuated control means carried by the frame and shiftable for effecting simultaneous axial movement of the spool to disengage the hub gear from the gear train and axial turning of said slotted sleeve and oscillation of said line guiding fingers in a path transversely of the spool.

5. A reel structure, comprising a frame, a shaft carried by the frame, a line spool supported on the shaft for axial and rotary movement, means for imparting rotary movement to the spool, the spool when shifted axially in one direction being detachable from said last means, a lever member pivotally supported intermediate its ends upon the frame and having one end operatively coupled with the spool, a plate supported for rectilinear movement on the frame and having a slot therein having its length extending in the direction of movement of the plate, said slot having two misalined portions, the other end of said lever being loosely engaged in said slot, and means for shifting said plate to either of two selected positions in one of which positions the said other end of the lever engages in one of the portions of the slot to axially shift the spool in a direction to disconnect it from the driving means and in the other of the positions the lever is engaged in the other portion of the slot to axially shift the spool to couple the spool with the driving means.

6. A fishing reel, comprising a frame, a shaft supported by the frame, a line spool supported on the shaft for rotational and axial movement, driving means for imparting rotary motion to the spool, the spool when shifted axially in one direction being disconnected from the driving means, a level winder unit supported by the frame and including a longitudinally slotted sleeve supported for turning on its long axis, a threaded shaft, a collar supported on the sleeve for lengthwise movement and having a coupling finger in operative connection with the threaded shaft through the slot of said sleeve and a pair of line guiding fingers carried by the collar, a driving connection between said threaded shaft and said spool driving means, a rack supported on the frame for rectilinear movement, a toothed segment carried by the sleeve and coupled with said rack, means for effecting the shifting of said rack, a pivoted lever supported adjacent to the rack and having one end operatively coupled with said spool, the rack when shifted in one direction effecting rotation of said sleeve through the segment to oscillate said line guiding fingers away from the spool, and an operative connection between the lever and the rack for effecting the oscillation of the lever in a direction to axially shift the spool out of connection with the driving means simultaneously with the oscillation of the guiding fingers away from the spool.

7. A fishing reel, comprising a frame, a shaft carried by the frame, a fishing line spool supported on the shaft for axial and rotational movement, means for imparting rotational movement to the spool when the spool is in one position, the spool being axially movable to a second position in which it is disengaged from said movement imparting means, a finger actuated shiftable member carried by the frame and having three operative positions, a lever pivotally supported upon the frame and connected at one end with said spool, said lever carrying a brake adapted for engagement with a portion of the spool and an operative coupling between the lever and the shiftable member which is so constructed and arranged that when the plate is in one position the lever will be shifted to axially move the spool to the said one position therefor and when the plate is in its second position the lever will be actuated to shift the spool into its second operating position and when the plate is in its third position the lever will be shifted to bring said brake into braking contact with the spool.

8. A fishing reel, comprising a frame having a base and spaced head and tail plates secured to the base, a shaft connecting said plates and secured at its ends thereto, a tubular shaft encircling and supported by the first shaft, anti-friction supporting means upon the inner faces of the head and tail plates with which the ends of said tubular shaft are engaged and by which the tubular shaft is maintained for rotation coaxial with the first shaft, a spool rotatably supported upon and coaxial with the tubular shaft, means carried by the frame and operatively coupled with the spool for effecting its rotation around the tubular shaft, a spring means for effecting rotation of the spool through the rotary shaft and through a part of the last-mentioned means, and said head and tail plates being free of connecting tie bars and being held in operative relation solely by the base plate and the first-mentioned shaft.

9. A fishing reel, comprising a frame having a base and spaced head and tail plates secured to the base, a shaft connecting said plates and secured at its ends thereto, a tubular shaft encircling and supported by the first shaft, anti-friction supporting means upon the inner faces of the head and tail plates with which the ends of said tubular shaft are engaged and by which the tubular shaft is maintained for rotation coaxial with the first shaft, a second tubular shaft encircling the first tubular shaft and having longitudinal movement thereon, a line spool on and coaxial with the second tubular shaft, an anti-friction unit within said spool at each end, each of said units including an inner element encircling and secured to the second tubular shaft and an outer element encircling the inner element and secured to the encircling spool, means carried by the frame and operatively coupled with the spool for effecting the rotation of the spool, means for effecting the axial movement of the second tubular shaft and the spool relative to the spool rotating means whereby the spool rotating means and the spool may be operatively coupled together or uncoupled, and said head and tail plates being maintained against separatory movement by the first-mentioned shaft and the first tubular shaft maintaining the head and tail plates in spaced relation.

CHARLES E. SANBORN.